United States Patent
Fan et al.

(10) Patent No.: US 12,245,287 B2
(45) Date of Patent: Mar. 4, 2025

(54) OPTIMIZATION FOR EARLY DATA TRANSMISSION (EDT)

(71) Applicant: Telefonaktiebolaget LM Ericsson (publ), Stockholm (SE)

(72) Inventors: Rui Fan, Beijing (CN); Andreas Höglund, Solna (SE); Tuomas Tirronen, Helsinki (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 338 days.

(21) Appl. No.: 17/763,159

(22) PCT Filed: Sep. 25, 2019

(86) PCT No.: PCT/CN2019/107745
§ 371 (c)(1),
(2) Date: Mar. 23, 2022

(87) PCT Pub. No.: WO2021/056242
PCT Pub. Date: Apr. 1, 2021

(65) Prior Publication Data
US 2022/0346152 A1 Oct. 27, 2022

(51) Int. Cl.
*H04W 74/0833* (2024.01)
*H04L 5/00* (2006.01)
*H04W 72/1268* (2023.01)

(52) U.S. Cl.
CPC ....... *H04W 74/0833* (2013.01); *H04L 5/0044* (2013.01); *H04W 72/1268* (2013.01)

(58) Field of Classification Search
None
See application file for complete search history.

(56) References Cited

U.S. PATENT DOCUMENTS

| 11,039,477 B2 * | 6/2021 | Charbit | H04W 72/23 |
| 11,064,356 B2 * | 7/2021 | Shrestha | H04L 9/3242 |

(Continued)

FOREIGN PATENT DOCUMENTS

| CN | 110012551 A | 7/2019 |
| CN | 110050502 A | 7/2019 |

(Continued)

OTHER PUBLICATIONS

International Search Report and Written Opinion issued in International Application No. PCT/CN2019/107745, dated Jun. 22, 2020 (8 pages).

(Continued)

*Primary Examiner* — Adolf Dsouza
(74) *Attorney, Agent, or Firm* — Rothwell, Figg, Ernst & Mabeck, P.C.

(57) ABSTRACT

There is provided a method for improving early data transmission (EDT). The method includes transmitting first transport block size (TBS) information indicating a first set of one or more EDT TBSs. The method further includes after transmitting the first TBS information, obtaining EDT usage information and based on the obtained EDT usage information, determining whether to transmit the first TBS information or second TBS information indicating a second set of one or more EDT TBSs. The method further includes transmitting the first TBS information or the second TBS information based on the determination.

18 Claims, 12 Drawing Sheets

(56) References Cited

U.S. PATENT DOCUMENTS

| | | | |
|---|---|---|---|
| 11,102,764 B2* | 8/2021 | Shrestha | H04W 72/02 |
| 2019/0104553 A1 | 4/2019 | Johansson et al. | |
| 2019/0159197 A1 | 5/2019 | Shrestha et al. | |
| 2019/0159257 A1* | 5/2019 | Rico Alvarino | H04W 74/0833 |
| 2019/0159260 A1 | 5/2019 | Charbit et al. | |
| 2019/0215872 A1* | 7/2019 | Park | H04W 52/0216 |
| 2022/0256587 A1 | 8/2022 | Fujishiro et al. | |

FOREIGN PATENT DOCUMENTS

| | | |
|---|---|---|
| EP | 3 651 503 A1 | 5/2020 |
| WO | 2019/031427 A1 | 2/2019 |
| WO | 2019/192940 A1 | 10/2019 |

OTHER PUBLICATIONS

Ericsson, "[99bis#53][MTC/NB-IoT] EDT indication via PRACH", 3GPP TSG-RAN WG2 #100, R2-1713057, Reno, Nevada, USA, Nov. 27-Dec. 1, 2017 (30 pages).

Ericsson, "Report on [100#38][MTC/NB-IoT] Padding issue in Msg3", 3GPP TSG-RAN WG2 #101, R2-1803077, Athens, Greece, Feb. 26-Mar. 2, 2018 (24 pages).

* cited by examiner

400

| EDT-TBS | EDT-Small TBS-Subset | Allowable TBS Values |
|---|---|---|
| 408 | Not configured | 328, 408 |
| 504 | Not configured | 328, 408, 504 |
| 504 | Enabled | 408, 504 |
| 584 | Not configured | 328, 408, 504, 584 |
| 584 | Enabled | 408, 584 |
| 680 | Not configured | 328, 456, 584, 680 |
| 680 | Enabled | 456, 680 |
| 808 | Not configured | 328, 504, 680, 808 |
| 808 | Enabled | 504, 808 |
| 936 | Not configured | 328, 504, 712, 936 |
| 936 | Enabled | 504, 936 |
| 1000 | Not configured | 328, 536, 776, 1000 |
| 1000 | Enabled | 536, 1000 |

FIG. 4

OPTIMIZATION FOR EARLY DATA TRANSMISSION (EDT)

CROSS REFERENCE TO RELATED APPLICATION(S)

This application is a 35 U.S.C. § 371 National Stage of International Patent Application No. PCT/CN2019/107745, filed Sep. 25, 2019.

TECHNICAL FIELD

Disclosed are embodiments related to devices and methods for optimizing early data transmission (EDT).

BACKGROUND

A conventional process of data transmission between a user equipment (UE) and a network node (e.g., the process disclosed in R-13 in 3GPP Standard for user plane based solution) requires exchanging multiple requests and responses between the UE and the network node prior to the data transmission. FIG. 2 illustrates an exemplary conventional process 200 of data transmission.

As shown in FIG. 2, in the process 200, UE 102a begins transmitting to a network node 104 uplink (UL) data (included in Msg5) and/or receiving from the network node 104 downlink (DL) data (included in Msg6) only after multiple requests (e.g., Msg1 and Msg3) and multiple responses (e.g., Msg2 and Msg4) are exchanged between the UE 102a and the network node 104.

SUMMARY

In order to reduce the delay of data transmission between the UE 102a and the network node 104 and to save power consumption at the UE 102a, a feature called EDT (early data transmission) is introduced in R-15 in 3GPP Standard for Narrow Band Internet of Things (NB-IoT) and Long Term Evolution, category M1 (LTE-M). With EDT, it is possible for the UE 102a to include the UL data in Msg3 instead of the Msg5 and/or to include the DL data in Msg 4 instead of the Msg 6. For a detailed description of EDT (including control plane (CP) EDT), please see 3GPP TS 36.300, section 7.3b.1.

FIG. 3 illustrates an exemplary process 300 of EDT between the UE 102a and the network node 104. The process 300 may begin with step s302. In the step s302, the network node 104 that supports EDT transmits a message Msg0. The message Msg0 may include information specifying a maximum EDT transport block size (TBS) that the UE 102a may use for EDT. In other words, the maximum EDT-TBS (herein after "EDT-TBS") corresponds to a threshold TBS for determining whether data having a particular TBS can be transmitted using EDT or must be transmitted using conventional data transmission process.

For example, if the UE 102a wants to send data having a TBS that is less than a given EDT-TBS, the UE 102a may transmit the data using EDT. On the other hand, if the UE 102a wants to send data having a TBS that is greater than the EDT-TBS, the UE 102a cannot transmit the data using EDT and must use the conventional data transmission process.

In some embodiments, the message Msg0 is a broadcasted message that includes system information block (SIB). The network node 104 may select one maximum TBS among a list of maximum TBSs and include information identifying the selected maximum TBS in the SIB of the message Msg0. The list of maximum TBSs may include {328, 408, 504, 584, 680, 808, 936, 1000}. Each of the values in the list may represent a bit length.

Additionally or alternatively, the message Msg0 may include information indicating whether the UE 102a can only use the EDT-TBS indicated in the message Msg0 for transmission of data to the network node 104 or can use any TBS in a set of TBSs associated with the EDT-TBS. For example, the message Msg0 may include "EDT-Small TBS-Enabled" field and the UE 102a can only use the given EDT-TBS when the field is set to a false value, while the UE 102a can select a TBS from a set of TBSs when the field is set to a true value. The message Msg0 may further include information indicating which set among multiple sets of TBSs associated with the maximum TBS may be used. For example, the message Msg0 may include "EDT-Small TBS-Subset" field and a restricted set of TBSs is selected when the field is enabled while a non-restricted set of TBSs is selected when the field is not configured. In the embodiments where the message Msg0 is a broadcasted message, the information described in this paragraph may be included in the SIB of the message Msg0.

FIG. 4 is a table 400 showing an exemplary list of EDT-TBSs and multiple sets of TBSs associated with each EDT-TBS. In the table 400, two sets of TBSs are provided for each EDT-TBS (except for EDT-TBS 408). For example, for the EDT-TBS 504, a restricted set of TBSs—{408, 504} and an unrestricted set of TBSs—{328, 408, 504} are provided. Here, the words "unrestricted set" merely mean that the set contains more TBSs than the restricted set of TBSs. Even though FIG. 4 shows that the listed EDT-TBSs are associated with one or two sets of TBSs, they may be associated with any number of sets of TBSs. Also, the number of TBSs included in each set can be any number greater than or equal to 1.

As discussed in the preceding paragraph, the "EDT-Small TBS-Subset" field indicates which of a restricted set of TBSs and an unrestricted set of TBSs is selected. For example, for the EDT-TBS 504, if the "EDT-Small TBS-Subset" field is enabled, the UE 102a may select a TBS only from the restricted set of TBSs—{408, 504}. On the other hand, if the "EDT-Small TBS-Subset" field is not configured, the UE 102a may select a TBS from the unrestricted set of TBSs—{328, 408, 504}.

Referring back to FIG. 3, after the UE 102a receives the message Msg0, if the UE 102a has small data to transmit (i.e., the data small enough to be transmitted using EDT), in the step s304, the UE 102a may select a preamble reserved for EDT and send to the network node 104 a message Msg1 comprising the selected preamble.

After the network node 104 receives the message Msg1, in step s306, the network node 104 may transmit to the UE 102a a message Msg 2 indicating EDT uplink (UL) grant.

The message Msg2 indicating the EDT UL grant may allow the UE 102a to choose an appropriate TBS, modulation coding scheme (MCS), repetitions, and resource units (for NB-IoT) to minimize potential padding for transmitting UL data.

After receiving the message Msg2 indicating the EDT UL grant, in step s308, the UE 102a may select the best TBS for EDT according to the information included in the message Msg0. For example, if the message Msg0 indicates that the UE 102a may select any one TBS from a set of TBSs, after receiving the message Msg2, the UE 102a may select one of TBSs included in the set of TBSs. On the other hand, if the message Msg0 indicates that the UE 102a can only select the EDT-TBS, the UE 102a may not perform the step of selecting the best TBS and may just use the EDT-TBS for transmitting a message Msg3.

After selecting the best TBS for EDT (or just using the EDT-TBS indicated in the message Msg0), in step s310, the UE 102a may send to the network node 104 a message Msg3 including UL data.

If the message Msg0 indicates that the UE 102a may use any one TBS included in a set of TBSs, after receiving the message Msg3 from the UE 102a, the network node 104 may need to perform blind decoding to process the UL data because the network node 104 does not have any information as to which TBS among the TBSs included in the set of TBSs the UE 102a chose to use for EDT.

For example, if the message Msg0 indicates that the EDT-TBS is 504 and that the UE 102a may select a TBS from the restricted set of TBSs associated with 504—{328, 408, 504}—(see FIG. 4), after the network node receives the message Msg3 from the UE 102a, the network node 104 needs to perform blind decoding because the network node 104 does not know which of 328, 408, and 504 that the UE 102a used for data transmission.

After the network node receives the message Msg3, in step s312, the network node may send a message Msg4 requesting the UE 102a to go to IDLE state if there is no more data to transmit.

In order to perform EDT efficiently, the EDT-TBS which corresponds to a maximum TBS that the UE 102a may use for EDT should be carefully selected.

FIG. 5 is a graph 500 showing an exemplary probability density function (pdf) of TBS usage. As shown in FIG. 5, if the EDT-TBS is set to a large value (the "Large EDT-TBS"), more data transmissions of UEs will be qualified for EDT and thus more UEs will obtain the benefit(s) of using EDT such as reduction of signaling which will lead to improved UE battery life.

Setting the EDT-TBS to a large value, however, may result in reduced resource efficiency. For example, when the UE 102a includes a buffer with data size that is smaller than the EDT-TBS and the message Msg1 indicates that the UE 102a may only use the selected EDT-TBS indicated in the message Msg1 for EDT, the UE 102a would occupy network resource with data having the selected EDT-TBS instead of the smaller data size. In such scenario, the UE 102a may have to unnecessarily transmit dummy bits (e.g., padding) corresponding to the difference between the size of the buffer and the selected EDT-TBS.

Setting the EDT-TBS to a large value may result in reduced resource efficiency even when the network node 104 allows the UE 102a to use TBS smaller than the EDT-TBS because then the network node 104 may have to allocate resource according to the EDT-TBS as the network node 104 does not know which TBS will be selected by the UE 102a.

Generally, this problem also occurs when a legacy process is used, but for the EDT, the problem is more severe since the EDT-TBS is not UE-specific, and the network node 104 doesn't have any buffer status report or similar to assist with EDT configuration.

On the other hand, if the EDT-TBS is set to a smaller value, the resource efficiency of the system may be good because there is only small amount of data to transmit using EDT, and thus there will be little resource waste (e.g., less padding). But as UEs are only allowed to use EDT when the size of data in their buffers is smaller than the EDT-TBS, the probabilities of UEs to use EDT is lower as compared to when the EDT-TBS is set to a large value. Those UEs that do not use EDT have to fallback to legacy procedure. Then, the overall system performance might be degraded and the power consumption at the UEs might be increased, as compared to when the EDT-TBS is set to a large value.

In addition to a careful selection of EDT-TBS, to perform EDT efficiently, the following considerations may need to be made: (1) whether to allow UEs to use only the EDT-TBS or to allow UEs to select a TBS from multiple TBSs and (2) if UEs are allowed to select a TBS from multiple TBSs, whether to allow UEs to select a TBS from a larger set of TBSs or a smaller set of TBSs.

Allowing the UE 102a to select from a set of TBSs the best TBS that matches the data size in its buffer may reduce power consumption at the UE 102a because using smaller TBS may require less number of subframes to transmit. But allowing the UE 102a to select a TBS from multiple TBSs may result in large increase in processing at the network node 104 as the network node 104 may have to perform more blind decoding for different TBSs included in the set of TBSs.

On the other hand, if the network node 104 restricts the number of TBSs included in the set of TBSs from which the UE 102 selects a desired TBS (e.g., configuring the set of TBSs to include two TBSs instead of four TBSs), less blind decoding may be needed at the network node 104. But this may result in more power consumption at the UE 102a because the UE 102a including a buffer with data size smaller than any of the TBSs in the set may have to select a TBS larger than the data size in its buffer, and therefore uplink transmission time would be increased and more power would be consumed at the UE 102a. Also, this may negatively impact system due to resource waste, as explained above.

Therefore, some embodiments of this disclosure are directed to methods and devices for finding an optimal EDT-TBS and allowing an optimal blind detection for EDT according to recorded historical packet transmission information from all NB-IoT and LTE-M users in a cell. Using the optimal EDT configuration would result in optimizing overall system performance by saving valuable radio sources (e.g., optimizing signaling reduction) and optimizing power consumption at all affected UEs (through RRC configuration).

According to some embodiments of this disclosure, in one aspect, there is a method for improving early data transmission (EDT). The method comprises transmitting, during a first period (e.g., a first slot), first transport block size (TBS) information indicating a first set of one or more EDT TBSs. The first set of EDT TBSs may comprise a maximum EDT TBS. The method further comprises after transmitting the first TBS information, obtaining EDT usage information and based on the obtained EDT usage information, determining whether to transmit, during a second period (e.g. second slot), the first TBS information or second TBS information indicating a second set of one or more EDT TBSs. The first set of EDT TBSs and the second set of EDT TBSs may be different. The method further comprises transmitting, during the second period, the first TBS information or the second TBS information based on the determination.

In another aspect there is provided an apparatus for improving EDT. The apparatus includes processing circuitry and a memory. The memory contains instructions executable by the processing circuitry, whereby the apparatus is operative to perform a method that includes transmitting, during a first period, first TBS information indicating a first set of one or more EDT TBSs, the first set of EDT TBSs comprising a maximum EDT TBS. The method also includes, after transmitting the first TBS information, obtaining EDT usage information, and, based on the obtained EDT usage information, determining whether to transmit, during a second period, the first TBS information or second TBS information indicating a second set of one or more EDT TBSs, wherein the first set of EDT TBSs and the second set of EDT TBSs are different. The method further includes transmitting, during the second period, the first TBS information or the second TBS information based on the determination.

BRIEF DESCRIPTION OF THE DRAWINGS

The accompanying drawings, which are incorporated herein and form part of the specification, illustrate various embodiments.

FIG. 4 is a table showing various EDT-TBSs and sets of TBSs associated with each of the EDT-TBSs.

DETAILED DESCRIPTION

As explained above, a particular EDT configuration is likely not optimal in all scenarios. For example, requiring use of only a large EDT-TBS may result in resource waste and increased UE power consumption if the actual sizes of transmission data in the buffers of the UEs are smaller than the EDT-TBS. As another example, requiring use of only a small EDT-TBS may result in more use of legacy random access procedure(s) and thus increased resource waste. Also using a small EDT-TBS may result in increased power consumption at UEs if the actual sizes of transmission data in the buffers of the UEs are larger than the EDT-TBS.

Accordingly, in some embodiments of this disclosure, the EDT-TBS that is optimal for a cell may be set based on any one or combination of the sizes of data actually transmitted from all UEs served by the cell, a resource efficiency, and a ratio/probability of using EDT procedure given the selected EDT-TBS.

Figure 1:
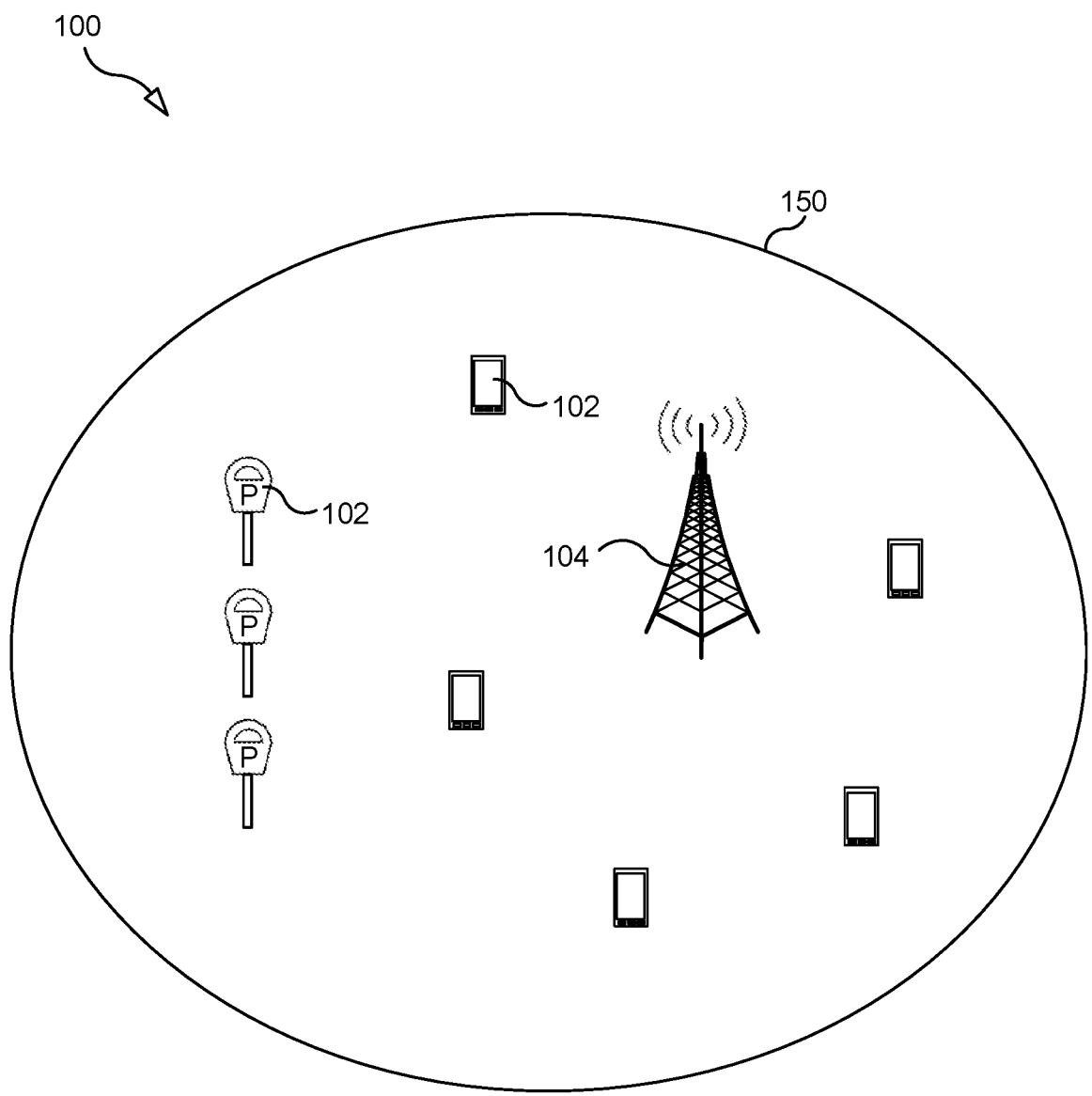
FIG. 1 illustrates a part of an exemplary communication system according to some embodiments.
Figure 2:
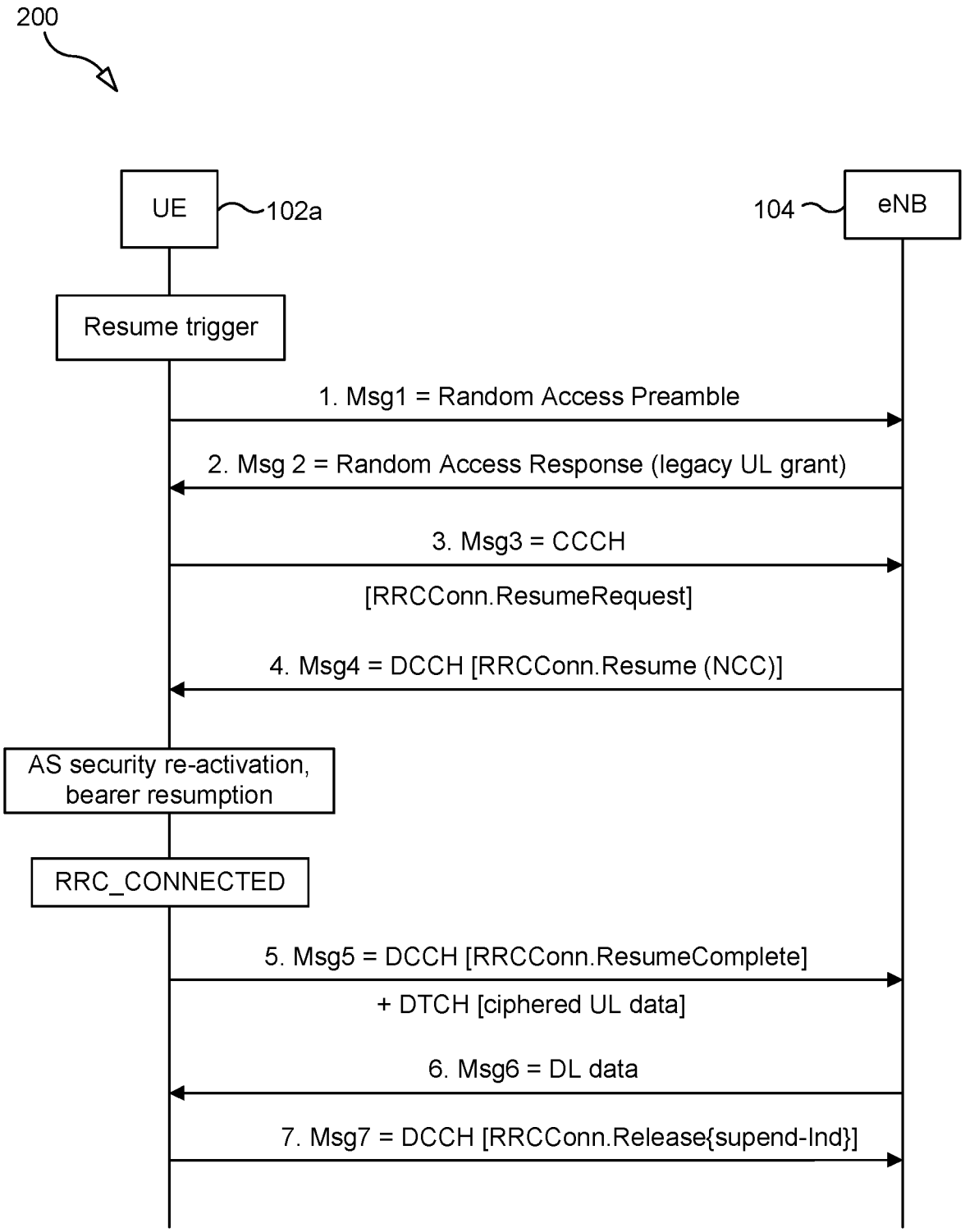
FIG. 2 shows an exemplary conventional process of data transmission.

FIG. 1 shows a portion of an exemplary communication system 100 according to some embodiments. In the system 100, the network node 104 may serve UEs 102 located in an area 150. The number of network node(s) and the number of UEs shown in FIG. 1 are just provided for illustration purpose only and do not limit the embodiments of this disclosure in any way.

The UEs 102 may be any device capable of connecting to a wireless network. For example, the UEs 102 may be a smart parking meter, a mobile phone, a tablet, a laptop, an IoT, or any other computing device. The network node 104 may be any network entity that may be involved in communicating with the UEs 102. In FIG. 1, the network node 104 is a base station (e.g., a 4G base station ("eNB")).

The UEs 102 may use EDT for data exchange with the network node 104. To optimize EDT, the system 100 may perform a process 600 shown in FIG. 6 according to some embodiments. In some embodiments, the network node 104 performs the process 600. In other embodiments, any one or more network entities (including the network node 104) perform the process 600.

The process 600 may begin with step s602. In the step s602, the system 100 sets an initial EDT configuration. In order for the network node 104 to obtain information regarding the sizes of actual data that the UEs 102 want to transmit to the network node 104, the network node 104 may initially allow the UEs 102 to use TBSs that are smaller than the EDT-TBS (e.g., allowing the UEs 102 to select any TBS smaller than the EDT-TBS from a non-restricted TBS set) so that the UEs 102 can choose the TBSs that match data size in their buffers instead of using the fixed EDT-TBS.

Figure 3:
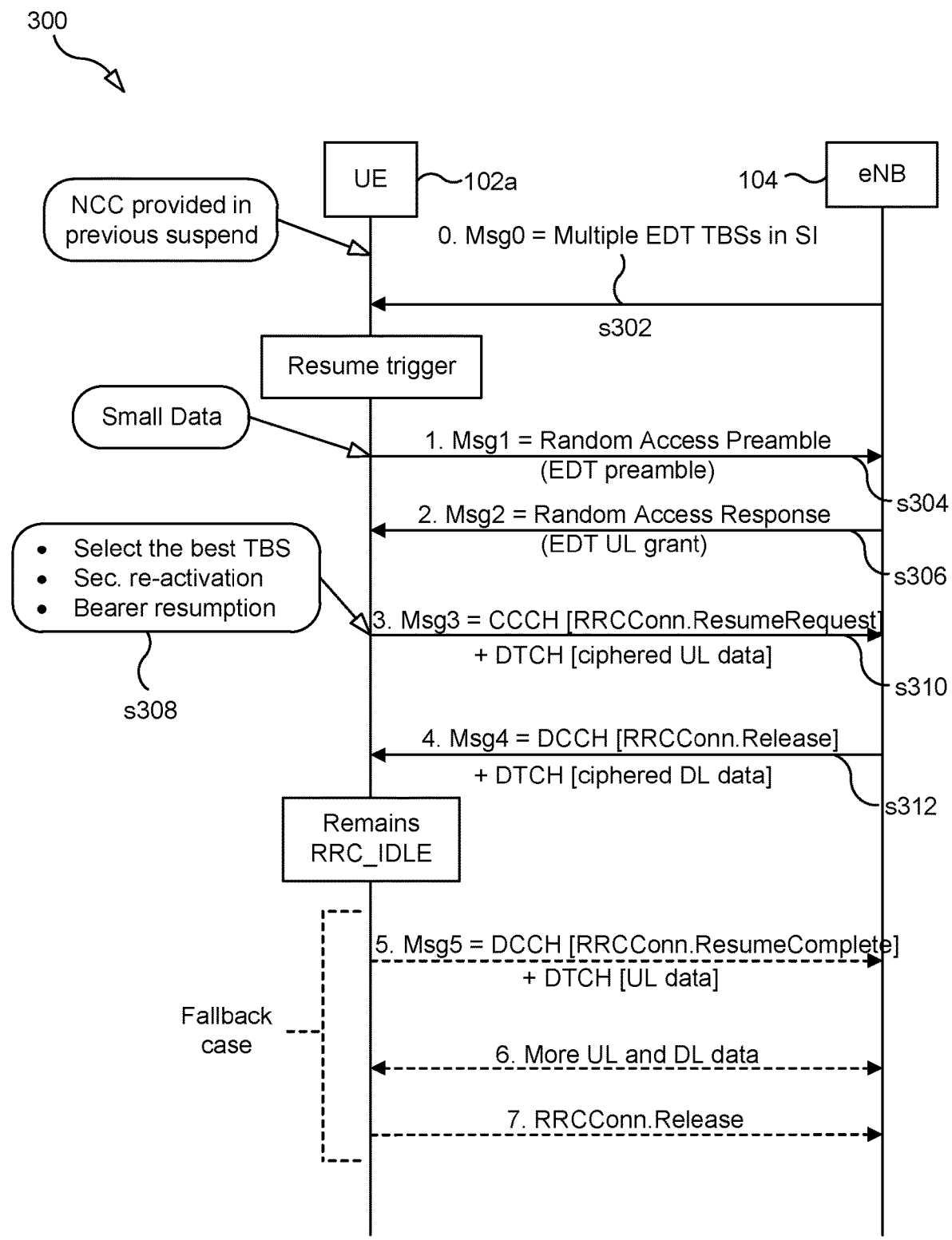
FIG. 3 shows an exemplary EDT process.
Figure 5:
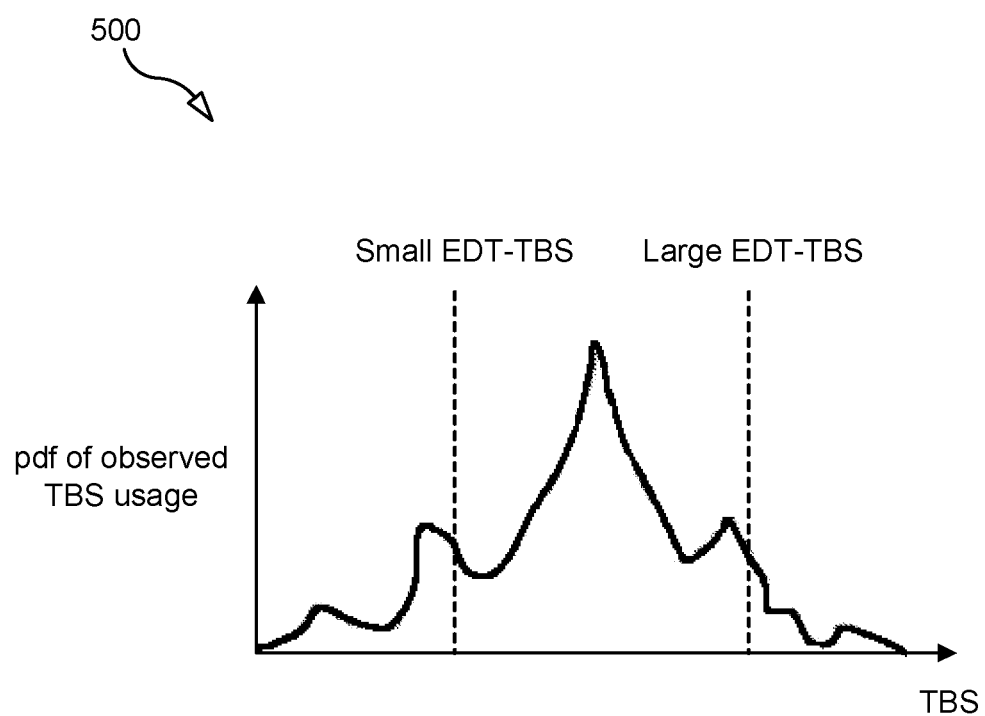
FIG. 5 is a graph showing an exemplary probability density function (pdf) of TBS usage.

For example, the network node 104 may configure the message Msg0 shown in FIG. 3 to include information identifying an initial EDT-TBS and information indicating that the UEs 102 are allowed to select any TBS smaller than or equal to the initial EDT-TBS from a non-restricted TBS set. In some embodiments, the message Msg0 is a broadcasted message including SIB and the information is included in the SIB.

After setting the initial EDT configuration, in step s604, the system 100 may log data samples collected during a period T to create a TBS distribution. For example, after the UEs 102 receive the message Msg0 from the network node 104, the UEs 102 may transmit actual uplink data to the network node 104 using any TBS that (1) is smaller than or equal to the initial EDT-TBS and that (2) is included in the non-restricted set of TBSs. The actual uplink data may be sent from the UEs 102 using the message Msg3 shown in FIG. 3.

Figure 7:
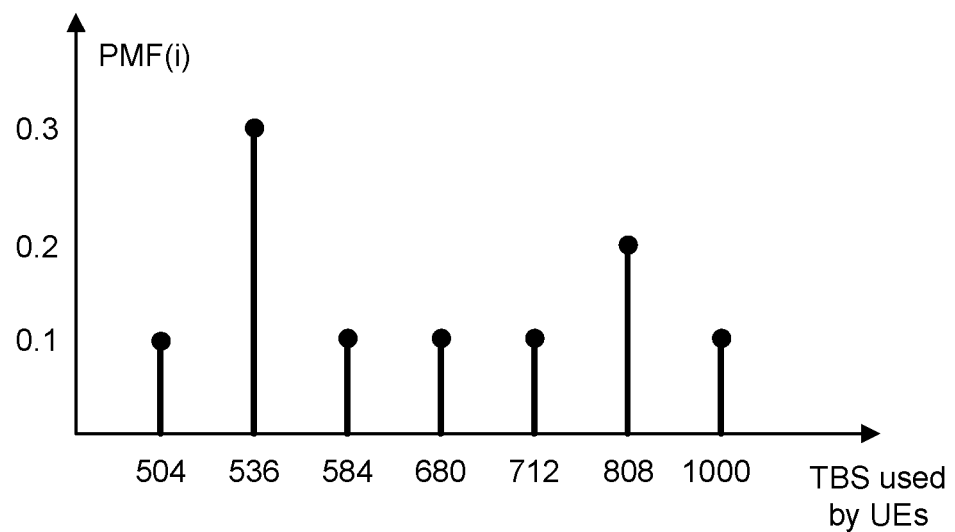
FIG. 7 is a graph illustrating various pmfs for different TBSs in an exemplary scenario.

After the network node 104 receives the actual data from the UEs 102, the network node 104 may analyze the received data to determine sizes of the received data. After the network node 104 collects information regarding sizes of data transmitted from the UEs for enough time, the network node 104 may build up a probability mass function (pmf) (or more generally a continuous probability density function (pdf) or empirical distribution function) for different TBSs included in the non-restricted set of TBSs, which will be used to calculate a resource efficiency later. FIG. 7 is a graph illustrating various pmf values for different TBSs.

The x-axis of the graph shown in FIG. 7 represents TBSs used by the UEs 102 for data transmission and the y-axis of the graph represents the pmf values corresponding to each TBS used by the UEs 102. For example, the pmf value of 0.1 for TBS 504 may indicate that among the UEs that used EDT for data transmission to the network node 104, 10% of the UEs used the TBS 504. Similarly, the pmf value of 0.3 for TBS 536 may indicate that among the UEs that used EDT for data transmission to the network node 104, 30% of the UEs used the TBS 536.

Referring back to FIG. 6, after creating the TBS distribution in the step s604, in step s606, the system 100 may determine an optimal EDT configuration based on the TBS distribution. Determining an optimal EDT configuration may comprise (1) determining an optimal EDT-TBS and/or (2) determining whether to allow the UEs 102 to select a TBS from a restricted set of TBSs or a non-restricted set of TBSs.

Figure 8:
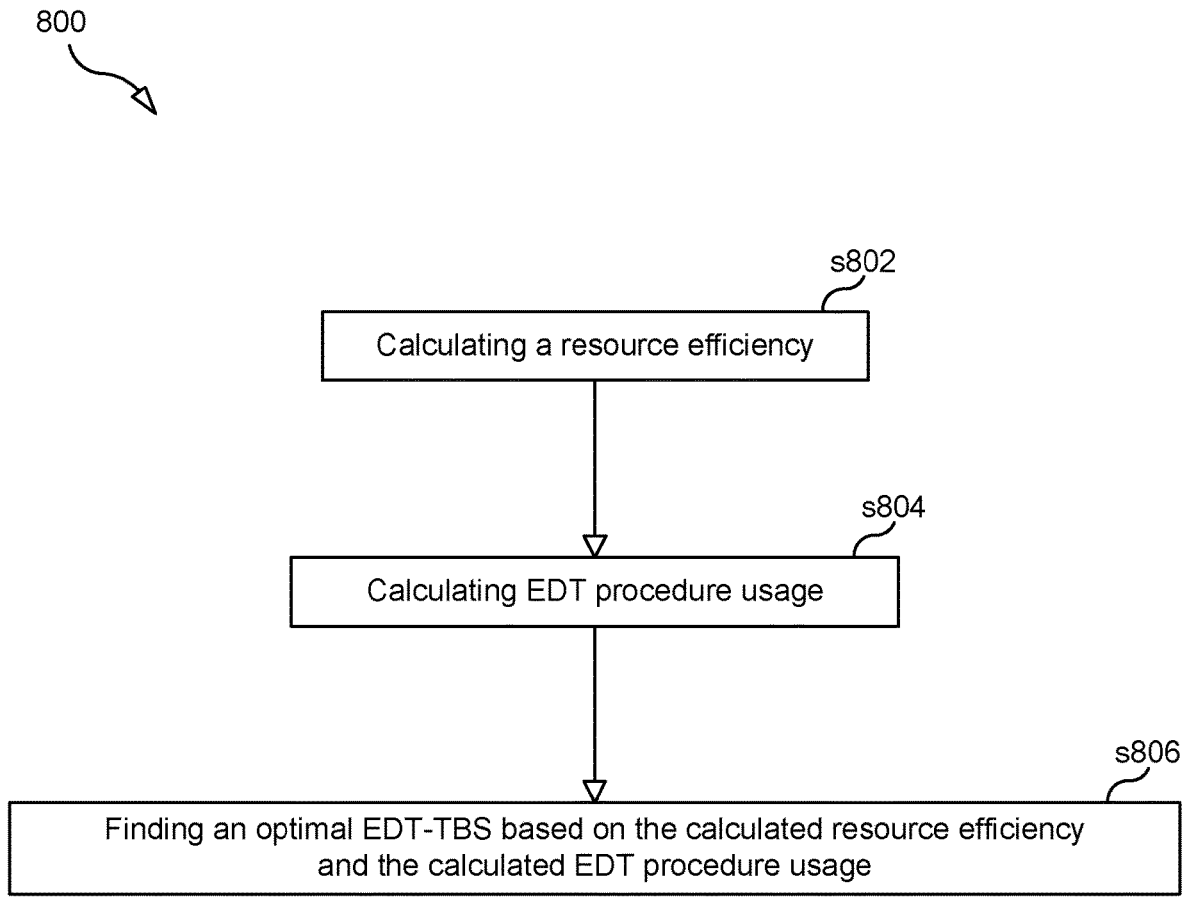
FIG. 8 illustrates a process of finding an optimal EDT-TBS according to some embodiments.

FIG. 8 illustrates a process 800 of determining an optimal EDT-TBS based on the TBS distribution according to some embodiments. The process 800 may begin with step s802. In the step s802, the system 100 calculates a resource efficiency. The resource efficiency may indicate an efficiency of EDT usage in the system 100. In some embodiments, the resource efficiency is calculated as follows:

$$\text{Resource Efficiency} = \frac{\text{Resource Needed}}{\text{Resource Allocated}}.$$

The "Resource Allocated" may be based on the initial EDT-TBS indicated in the message Msg0 shown in FIG. 3. In some embodiments, the "Resource Allocated" may be equal to the initial EDT-TBS. Here, the "Resource Allocated" reflects the actual resources that are allocated from the network node 104 for EDT.

The "Resource Needed" may be based on the values of TBSs that the UEs 102 used for data transmission (e.g., using the Msg3) and the pmf value associated with each of the TBSs. For example, the "Resource Needed" may be calculated as below:

Resource Needed=$\Sigma_{i=0}^{N}$ TBS(i)*pmf(i), where N is the total number of TBSs in the non-restricted set of TBSs and pmf(i) is the probability mass function of TBS(i) included in the non-restricted set of TBSs. Here, the "Resource Needed" reflects the resources that match the actual needs of the UEs 102.

Taking the pmf values shown in FIG. 7 as an example, the "Resource Needed" may be calculated as follows. In FIG. 7, TBS(0) corresponds to 504 and pmf(0) corresponds to 0.1. Similarly, TBS(1) corresponds to 536 and pmf(1) corresponds to 0.3. Thus, in this example, Resource Needed=$\Sigma_{i=0}^{N}$ TBS(i)*pmf(i)=504*0.1+536*0.3+584*0.1+ 680*0.1+712*0.1+808*0.2+1000*0.1=541.76.

Assuming that the initial EDT-TBS is equal to 1000, the "Resource Allocated" may be equal to 1000. Thus, in the example above, the resource efficiency is equal to $$\frac{541.76}{1000} = 0.54.$$

Referring back to FIG. 8, after performing the step s802, the system 100 may perform step s804. Even though FIG. 8 shows that the step s804 is performed after the step s802, in some embodiments, the step s804 may be performed before the step s802.

In the step s804, the system 100 may calculate EDT procedure usage ratio. The EDT procedure usage ratio may be calculated based on a number of EDT procedures performed during a period and a number of a particular group of legacy procedures (e.g., legacy random access procedures) performed during the period. The particular group of legacy procedures may be a group of legacy procedures involving transmission of data that can be transmitted using EDT procedures. For example, assuming that EDT procedures cannot be performed for data having TBS greater than 1000 bits, legacy procedures involving transmission of data having TBS greater than 1000 bits need not be considered in calculating the EDT procedure usage ratio because it is not possible to use EDT for transmission of data having such size.

In some embodiments, the EDT procedure usage ratio may be calculated as follows:

$$\text{ratio\_of\_edt} = \frac{\text{nrof\_randomaccess\_edt}}{\text{nrof\_randomaccess\_edt} + \text{nrof\_randomaccess\_legacy}},$$

where the "nrof_randomaccess_edt" corresponds to the number of EDT procedures performed during a period and the "nrof_randomaccess_legacy" corresponds to the number of legacy procedures that qualify the criteria discussed in the preceding paragraph. Here, the EDT procedure usage ratio reflects the possibility that the UEs in a cell can use EDT.

In calculating the EDT procedure usage ratio, to avoid counting random access procedure initiated by R-13/R-14 UEs, it may be better to configure random access channel preamble (PRACH) resource for R-15 UEs different from the one used by R-13/R14 UEs.

Figure 9:
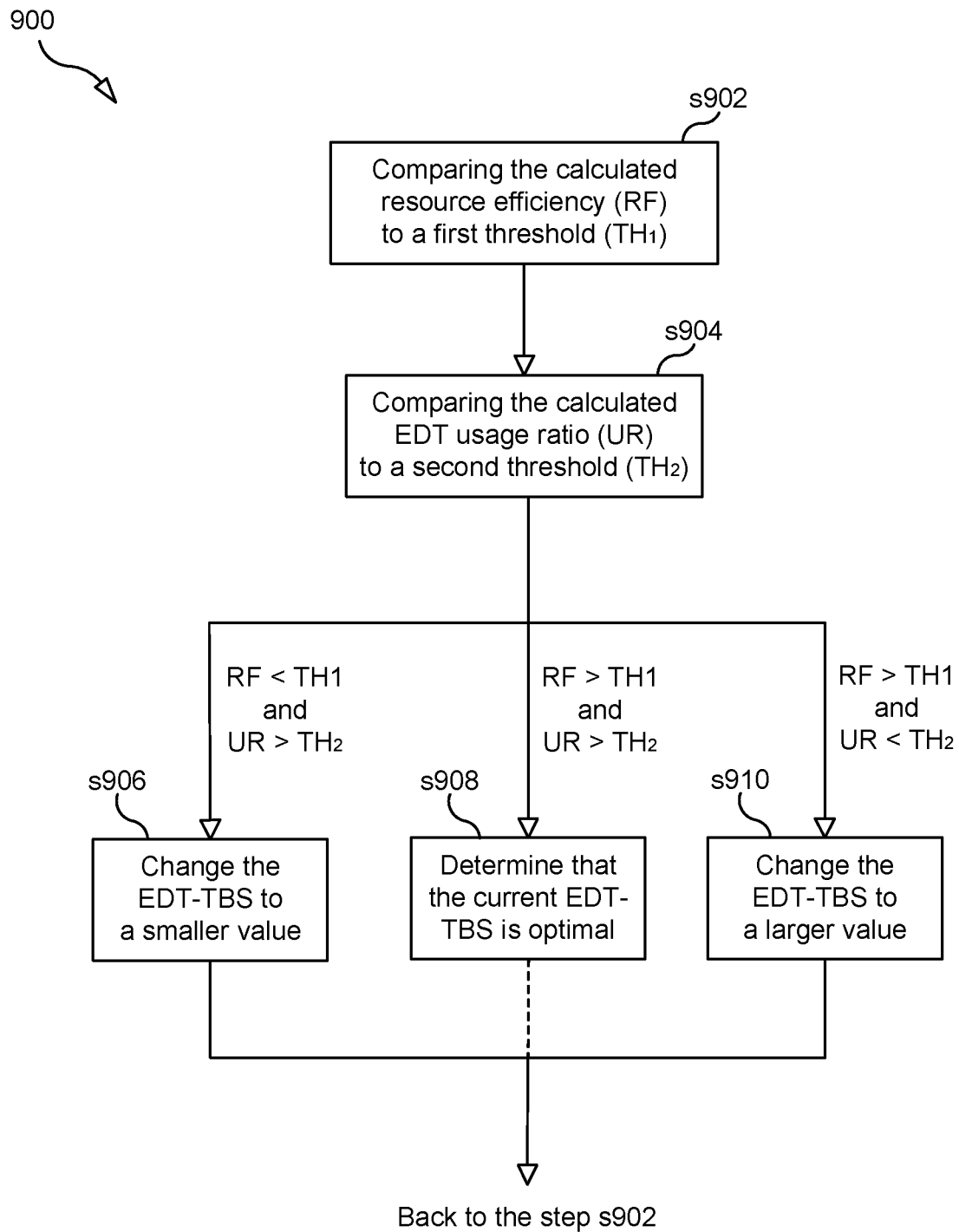
FIG. 9 illustrates a process of finding an optimal EDT-TBS according to some embodiments.

After calculating the EDT procedure usage ratio, the system 100 may perform step s806. In the step s806, the system 100 may select a more optimal EDT-TBS based on the resource efficiency calculated in the step s802 and the EDT procedure usage ratio calculated in the step s804. FIG. 9 illustrates a process of selecting a more optimal EDT-TBS according to some embodiments.

The process 900 may begin with step s902. In the step s902, the system 100 may compare the calculated resource efficiency to a first threshold $TH_1$. After performing the step s902, in step s904, the system 100 may compare the calculated EDT usage ratio to a second threshold $TH_2$. The steps s902 and s904 may be performed in any sequence or may be performed simultaneously.

If the calculated resource efficiency is less than the first threshold $TH_1$ and the calculated EDT usage ratio is greater than the second threshold $TH_2$, the system would know that the current EDT-TBS is a bit large. Thus, after performing the steps s902 and s904, the system 100 may perform step s906 in which the system 100 changes the EDT-TBS to a smaller value. The updated EDT-TBS may be indicated to the UEs 102 in the next SI modification period.

If the calculated resource efficiency is greater than the first threshold $TH_1$ and the calculated EDT usage ratio is less than the second threshold $TH_2$, the system would know that the current EDT-TBS is a bit small. Thus, the system 100 may perform step s910 in which the system 100 changes the EDT-TBS to a larger value. Like the step s906, the updated EDT-TBS may be indicated to the UEs 102 in the next SI modification period.

After performing the step s906 or the step s910, the process 900 returns back to the step s902. The procedure may continue until that the calculated resource efficiency becomes greater than the first threshold $TH_1$ and the calculated EDT usage ratio becomes greater than the second threshold $TH_2$.

When the calculated resource efficiency becomes greater than the first threshold $TH_1$ and the calculated EDT usage ratio becomes greater than the second threshold $TH_2$, the system 100 may determine that the current EDT-TBS is optimal. In some embodiments, the process 900 may be performed periodically or repeatedly in a non-periodic manner. In those embodiments, after performing the step s908, the process 900 returns back to the step s902.

Referring back to FIG. 6, in addition to determining an optimal EDT-TBS, the step s606 may further comprise determining whether to allow the UEs 102 to select a desired TBS from a restricted set of TBSs or a non-restricted set of TBSs.

For example, in the exemplary sets of TBSs shown in FIG. 4, each of the listed EDT-TBSs (except for 408) is associated with two sets of TBSs—a set of four TBSs and a set of two TBSs. The step s606 may comprise determining whether to allow the UEs 102 to select a desired TBS from the set of four TBSs (corresponding to a non-restricted set of TBSs) or from the set of two TBSs (corresponding to a restricted set of TBSs).

Using a restricted set of TBSs may provide the benefit of reducing blind decoding at the network node 104 but has the drawback of causing increased power consumption at the UEs 102 (or at least some of the UEs 102).

Accordingly, in some embodiments of this disclosure, whether to use a restricted set of TBSs or an unrestricted set of TBSs as the set of candidate TBSs from which the UEs 102 selects a desired TBS may be determined based on how much the power consumed at the UEs 102 is increased after switching from using the unrestricted set of TBSs to using the restricted set of TBSs.

Figure 10:
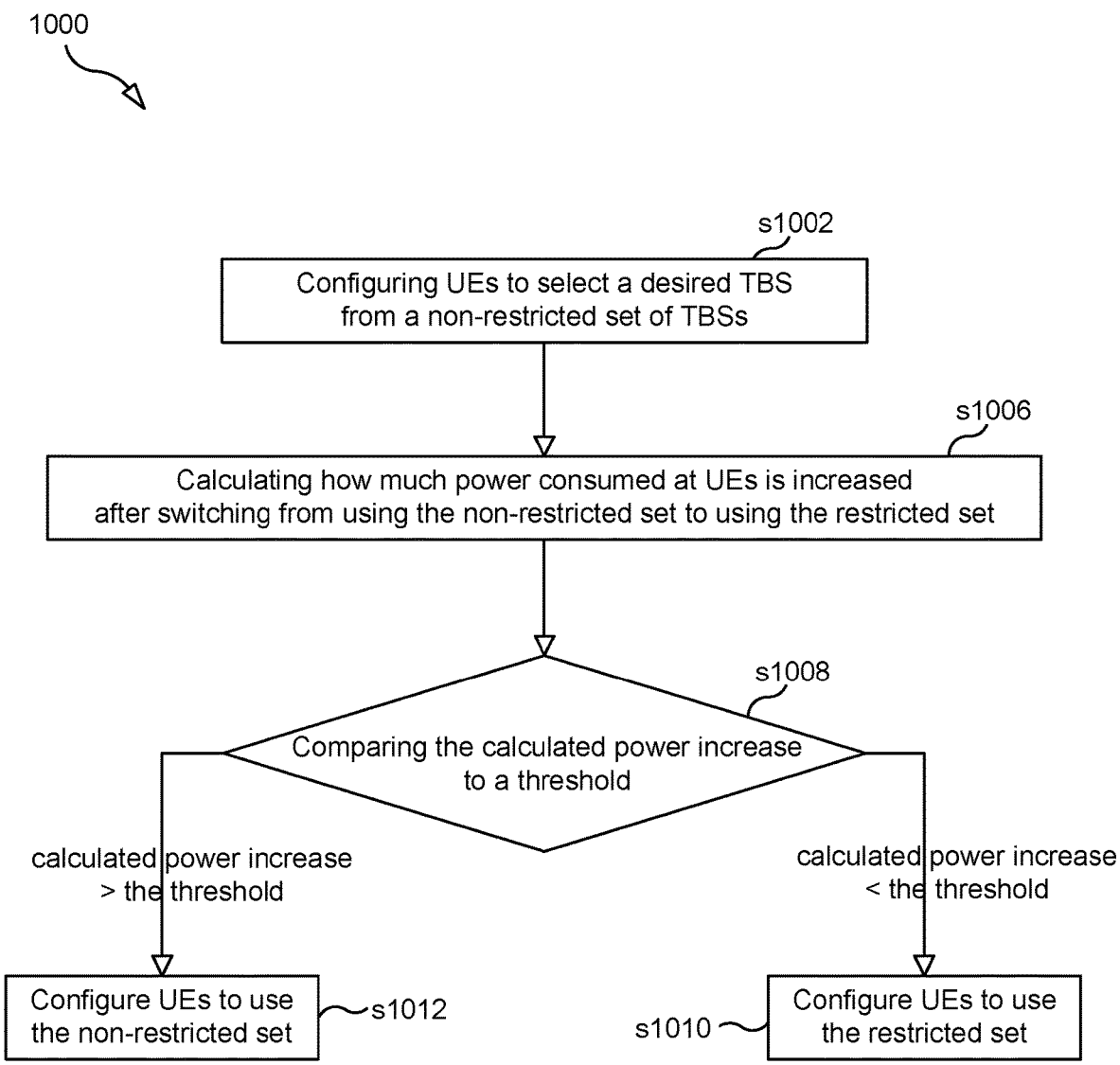
FIG. 10 illustrates a process of determining whether to use a non-restricted set of TBSs or a restricted set of TBSs according to some embodiments.

FIG. 10 illustrates a process 1000, according to some embodiments, of determining whether to use a restricted set of TBSs or an unrestricted set of TBSs as the set of TBSs from which the UEs 102 selects a desired TBS. The process 1000 may be performed by the network node 104 alone or by any one or more network entities (including the network node 104) in the system 100. The process 1000 may begin with step s1002.

In the step s1002, the system 100 may initially configure the UEs 102 to select a desired TBS from an unrestricted set of TBSs. For example, referring to FIG. 4, the UEs 102 may receive from the network node 104 information indicating that (1) the EDT-TBS selected by the network node 104 is 1000 and (2) the UEs 102 may select a desired TBS from the unrestricted set of TBSs {328, 536, 776, 1000} associated with the selected EDT-TBS (1000).

After performing the step s1002, in step s1006, the system 100 may calculate how much the power consumed at the UEs 102 is increased after the UEs 102 are switched from using the non-restricted set to using the restricted set. In the example described in the preceding paragraph, the restricted set of TBSs associated with the selected EDT-TBS is {536, 1000} as shown in FIG. 4.

In some embodiments, the amount of the increment of the power consumption at the UEs 102 is calculated as follows:

$$power\_increase = \frac{equivaelnt\,TBS\_restricted}{equivalent\,TBS\_nonrestricted}.$$

The equivalentTBS_nonrestricted may be equal to $\Sigma_{i=1}^{N}$ tbs(i)*pmf(i), where i is an index of TBS in the unrestricted set of TBSs and N is the total number of TBSs included in the unrestricted set of TBSs.

For example, when the EDT-TBS selected by the network node 104 is 1000, in the exemplary sets of TBSs shown in FIG. 4, the non-restricted set of TBSs corresponding to the EDT-TBS 1000 is {328, 536, 776, 1000}. Thus, for the purpose of calculating the power increase, N would be equal to 4 and the tbs(i) would correspond to each of 328, 536, 776, and 1000.

Thus, assuming that the pmf value of the TBS 328 is 0.2, the pmf value of the TBS 536 is 0.4, the pmf value of the TBS 776 is 0.3, and the pmf value of the TBS 1000 is 0.1, the equivalentTBS_nonrestricted would be equal to 328*0.2+536*0.4+776*0.3+1000*0.1.

Like the equivalentTBS_nonrestricted, the equivalentTBS_restricted may be equal to $\Sigma_{i=1}^{N}$ tbs(i)*pmf(i), where i is an index in the restricted set of TBSs and N is the total number of TBSs included in the restricted set of TBSs. But for the restricted set of TBSs, the pmf associated with each TBS is calculated differently.

In some embodiments, the pmf value of each TBS in the restricted TBS set is calculated as follows: for n=1 to $N_r$, where $N_r$ is the number of TBSs included in the restricted TBS set, pmf(n)_restricted=($\Sigma_{l=1}^{k}$ pmf(l)_unrestricted)−pmf(n−1)_restricted, where n is the index of TBS in the restricted set, l is the index of TBS in the non-restricted set, and k is selected such that TBS(k)_unrestricted= TBS(n)_restricted.

In the example provided above, when the selected EDT-TBS is 1000, in the exemplary sets of TBSs shown in FIG. 4, the restricted set of TBSs corresponding to the EDT-TBS 1000 is {536, 1000}. Then the pmfs of the TBS in the restricted set may be calculated as follows: The pmf value of the TBS 536 is the sum of the pmf value of the TBS 328 (0.2) and the pmf value of the TBS 536 (0.4). The pmf value of the TBS 1000 is the sum of the pmf value of the TBS 776 (0.3) and the pmf value of the TBS 1000 (0.1). Thus, in this example, the equivalentTBS_restricted would be equal to 536*0.6+1000*0.4.

Because (1) the power consumption at a UE is related to how much time is needed for an uplink transmission from the UE to a network node and (2) the number of resource units (RUs) and the allocated number of sub-carriers are fixed once the EDT-TBS is determined, according to 3GPP 36.213, the factors that may affect uplink transmission duration may be the repetition number and the number of resource units used through the total number of bits to be transmitted. The repetition number may be determined according to the description in 36.213 as follows: the repetition number for the message Msg3 is the smallest integer multiple of L value that is equal to or larger than $$\frac{TBS_{Msg3}}{TBS_{Msg3,max}}.$$

$N_{Rep}$ where the $TBS_{Msg3}$ is the selected TBS for the message Msg3, and the $TBS_{Msg3}$, max is given by higher layer parameter EDT-TBS. That is, the repetition number is related to the selected TBS for the message MSG3. Then it is possible to calculate the equivalent MSG3 size for the non-restricted set of TBSs and the restricted set of TBSs, which can represent the power consumption at UEs to see how much power consumption is increased.

Referring back to FIG. 10, after calculating the amount of the increment of the power consumption at the UEs 102 in the step s1006, in step s1008, the system 100 may compare the calculated amount of the increment of the power consumption to a threshold.

If the increment amount is lower than the threshold, in step s1010, the system 100 may configure the UEs 102 to use the restricted set of TBSs for data transmission because using the restricted set of TBSs would benefit the network node 104 (e.g., less blind decoding at the network node 104) without negatively affecting the UEs 102 too much. On the other hand, if increment amount is higher than the threshold, in step s1012, the system 100 may configure the UEs 102 to use the non-restricted set of TBSs for data transmission.

In other embodiments, the power consumption at the UEs 102 when the UEs 102 selected TBSs from the non-restricted set and the power consumption at the UEs 102 when the UEs 102 selected TBSs from the restricted set of TBSs may be compared by directly comparing TBSs in the non-restricted set and TBSs in the restricted set.

Specifically, because the amount of power consumption at the UEs 102 correlates to the size of possible paddings, if the network node 104 knows typical TBSs that the UEs 102 prefer to use (and thus the pmf associated with each TBS), the network node 104 may directly compare TBSs in the non-restricted set and TBSs in the restricted set, and determine whether configuring the UEs 102 to select a desired TBS from the restricted set would result in much more power consumption at the UEs 102 as compared to when the UEs 102 are configured to select a desired TBS from the non-restricted set.

The comparison of the TBSs in the non-restricted set and the TBSs in the restricted set may be performed by calculating an average overhead of each option. If the average overhead is under a threshold (e.g., when it is not expected that the restricted set would result in heavy increase of power consumption), the restricted set of TBSs may be used. On the other hand, if the average overhead is above or equal to the threshold, the non-restricted set of TBSs may be used.

For example, assuming that the network node 104 serves a total of four UEs 102 two of which have a desired TBS value of 328 and the other two of which have a desired TBS value of 1000, if the non-restricted set of TBSs is {328, 536, 776, 1000} and the restricted set of TBSs is {536, 1000}, no padding is required when the non-restricted set of TBSs is selected because all of the TBS values desired by the UEs 102 are already included in the selected set of TBS. On the other hand, when the restricted set of TBSs is selected, some paddings would be required for the two of the UEs 102 that have a desired TBS value of 328. The average overhead resulting from the required paddings may be calculated based on (1) the difference between the TBS value(s) desired by some of the UEs 102, which is not included in the restricted set (e.g., 328) and the TBS value(s) included in the restricted set that is closest to the desired TBS value(s) (e.g., 536) and (2) the number of EDT procedures that used the desired TBS value(s) which is not included in the restricted set (e.g. here, two UEs used the TBS 328 which is not included in the restricted set of TBS values—{536, 1000}).

Whether to select the non-restricted set or the restricted set of TBSs may be determined based on a value reflecting the amount of padding.

In some embodiments, the above methods of determining whether to use the non-restricted set of TBSs or to use the restricted set of TBSs as the set of TBSs from which the UEs 102 select desired TBSs may also be used to determine whether to allow the UEs 102 to use a single TBS (i.e., the EDT-TBS) or to select a desired TBS from multiple candidate TBSs.

In addition to the power consumption at the UEs 102, the network node 104 may also consider network/cell load conditions in finding optimal EDT-TBS configuration. For example, when the network node 104 is under heavy load, it makes sense to select EDT-TBS configuration such that the selected EDT-TBS configuration does not lead to multiple blind decoding attempts. Thus, in some embodiments, the network node 104 may set one or more thresholds for network/cell load condition. For example, if the current network load detected by the network node 104 is greater than a first threshold, the network node 104 may select EDT-TBS configuration that does not involve a particular number of decoding attempts (e.g., 4). On the other hand, if the current network load detected by the network node 104 is greater than a second threshold, the network node 104 may select EDT-TBS that does not involve any decoding attempts.

Referring back to FIG. 6, after the system 100 determines an optimal EDT configuration, in step s608, the system 100 may notify the UEs 102 regarding the determined optimal EDT configuration. For example, the network node 104 may broadcast a message comprising SIB that includes information identifying the determined optimal EDT configuration.

Figure 6:
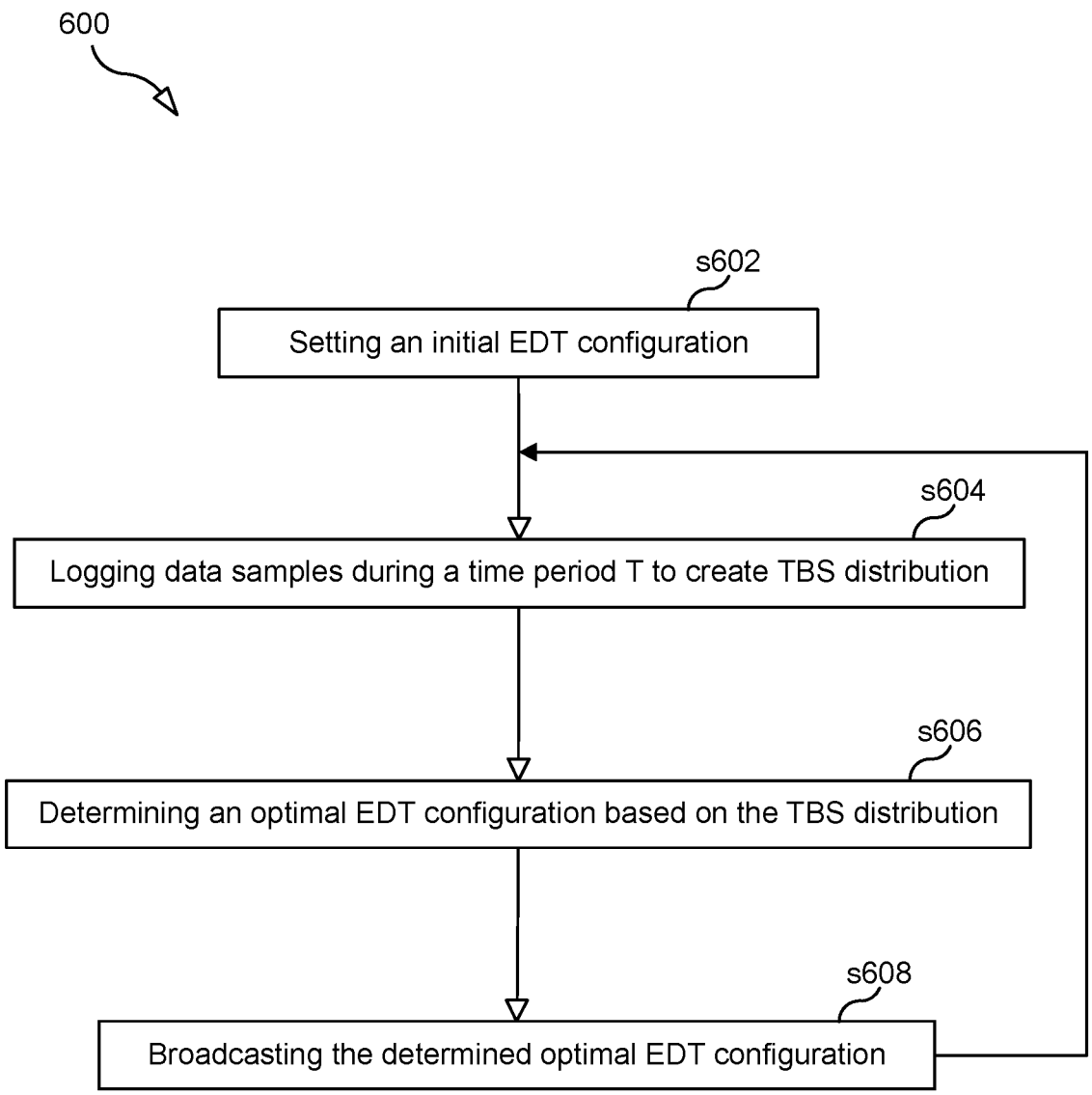
FIG. 6 illustrates a process of optimizing EDT configuration according to some embodiments.

As shown in FIG. 6, in some embodiments, the process of determining an optimal EDT configuration may be performed periodically or repeatedly in a non-periodic manner. Thus, in some embodiments, after broadcasting the message including information identifying the determined optimal EDT configuration, the system 100 may perform again the step s602—logging data samples during a next time period to create updated TBS distribution. After creating the updated TBS distribution, in the step s606, the system 100 may determine an updated optimal EDT configuration based on the updated TBS distribution and, in the step s608, broadcast a message including the updated optimal EDT configuration.

Figure 11:
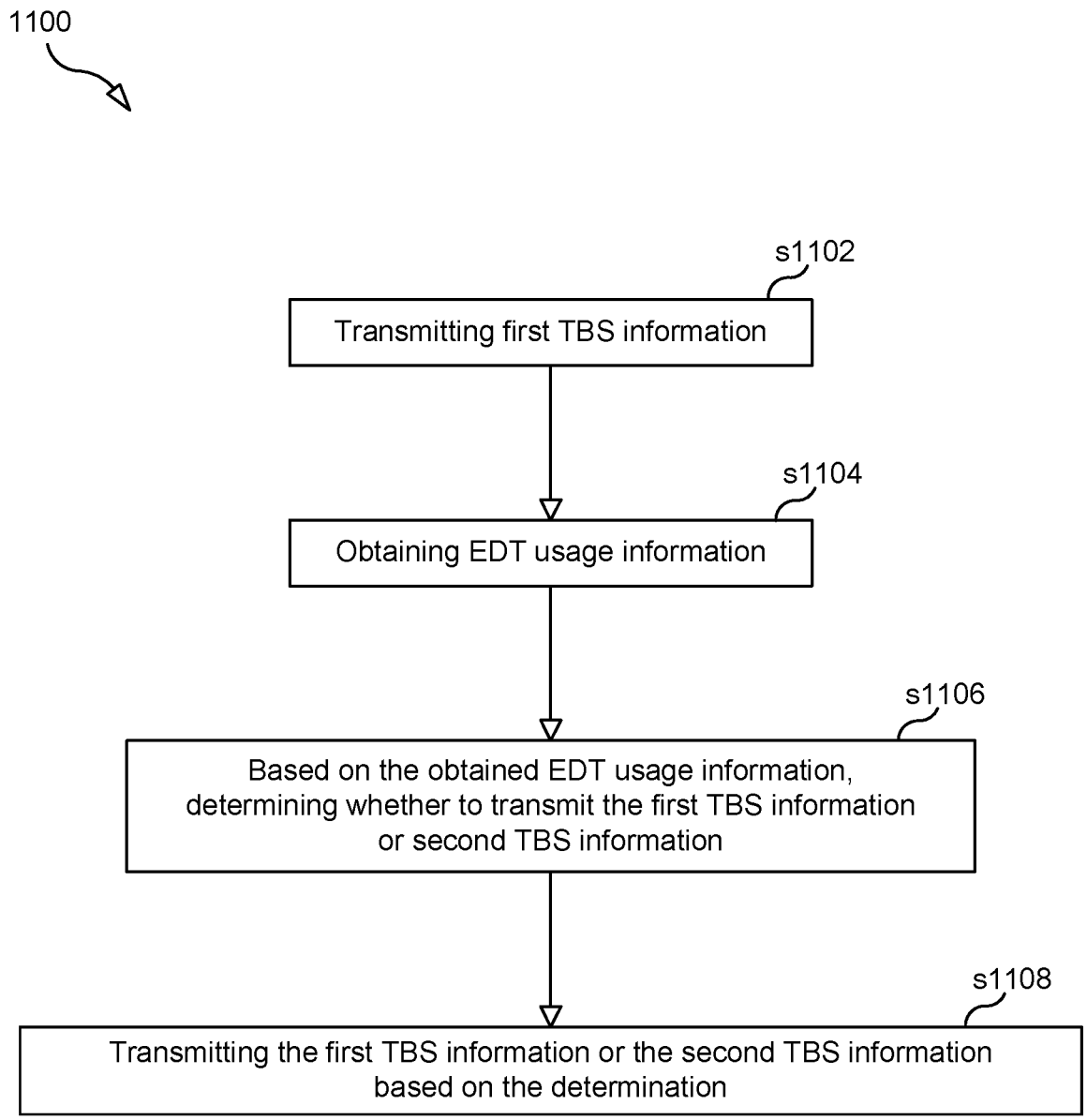
FIG. 11 illustrates a flow chart illustrating a process according to some embodiments.

FIG. 11 is a flow chart illustrating a process 1100 for optimizing EDT configuration. Process 1100 may be performed by the network node 104 and begin in step s1102.

Step s1102 comprises transmitting, during a first period (e.g., a slot), first transport block size (TBS) information. The first TBS information may indicate a first set of one or more EDT TBSs. The first set of EDT TBSs may comprise a maximum EDT TBS.

Step s1104 comprises obtaining EDT usage information.

Step s1106 comprises based on the obtained EDT usage information, determining whether to transmit, during a second period, the first TBS information or second TBS information indicating a second set of one or more EDT TBSs. The first set and the second set of EDT TBSs may be different.

Step s1108 comprises transmitting, during the second period (e.g., a later slot), the first TBS information or the second TBS information based on the determination.

In some embodiments, the EDT usage information comprises i) information indicating a number of EDTs performed during a time period and ii) for each EDT performed during the time period, information indicating the TBS used for the EDT.

In some embodiments, determining whether to transmit the first TBS information or the second TBS information comprises: calculating a resource efficiency based on the obtained EDT usage information, calculating an EDT usage ratio based on the obtained EDT usage information, comparing the resource efficiency to an efficiency threshold, and comparing the EDT usage ratio to a usage threshold.

In some embodiments, determining whether to transmit the first TBS information or the second TBS information comprises calculating a resource efficiency based on the obtained EDT usage information.

In some embodiments, the resource efficiency is equal to RN/RA and RA is equal to the maximum TBS. A probability value may be assigned to each EDT TBS included in the first set of EDT TBSs, and RN may be determined based on the assigned probability values.

In some embodiments, $RN=\Sigma_{i=1}^{N} TBS(i)*pmf(i)$, where N is the number of EDT TBSs in the first set of one or more EDT TBSs, TBS(i) is the ith EDT TBS included in the first set of EDT TBSs, and pmf(i) is the probability value assigned to the ith EDT TBS.

In some embodiments, determining whether to transmit the first TBS information or the second TBS information comprises comparing the resource efficiency to an efficiency threshold. The method may further comprise after determining that the resource efficiency is less than the efficiency threshold, selecting the second set of TBSs such that the second set of TBSs includes a maximum EDT TBS that is smaller than the maximum EDT TBS included in the first set of EDT TBSs.

In some embodiments, determining whether to transmit the first TBS information or the second TBS information includes calculating an EDT usage ratio based on a number of EDT procedures performed during a certain time period.

In some embodiments, the EDT usage ratio is equal to $$\frac{nrof\_randomaccess\_edt}{nrof\_randomaccess\_edt + nrof\_randomaccess\_legacy},$$

where the nrof_randomaccess_edt corresponds to the number of EDT procedures performed during a period and the nrof_randomaccess_legacy corresponds to the number of a particular group of legacy procedures performed during the period.

In some embodiments, determining whether to transmit the first TBS information or the second TBS information comprises comparing the EDT usage ratio to a usage threshold. The method may further comprise after determining that the EDT usage ratio is higher than the usage threshold, selecting the second set of TBSs such that the second set of TBSs includes a maximum EDT TBS that is smaller than the maximum EDT TBS included in the first set of EDT TBSs.

Figure 12:
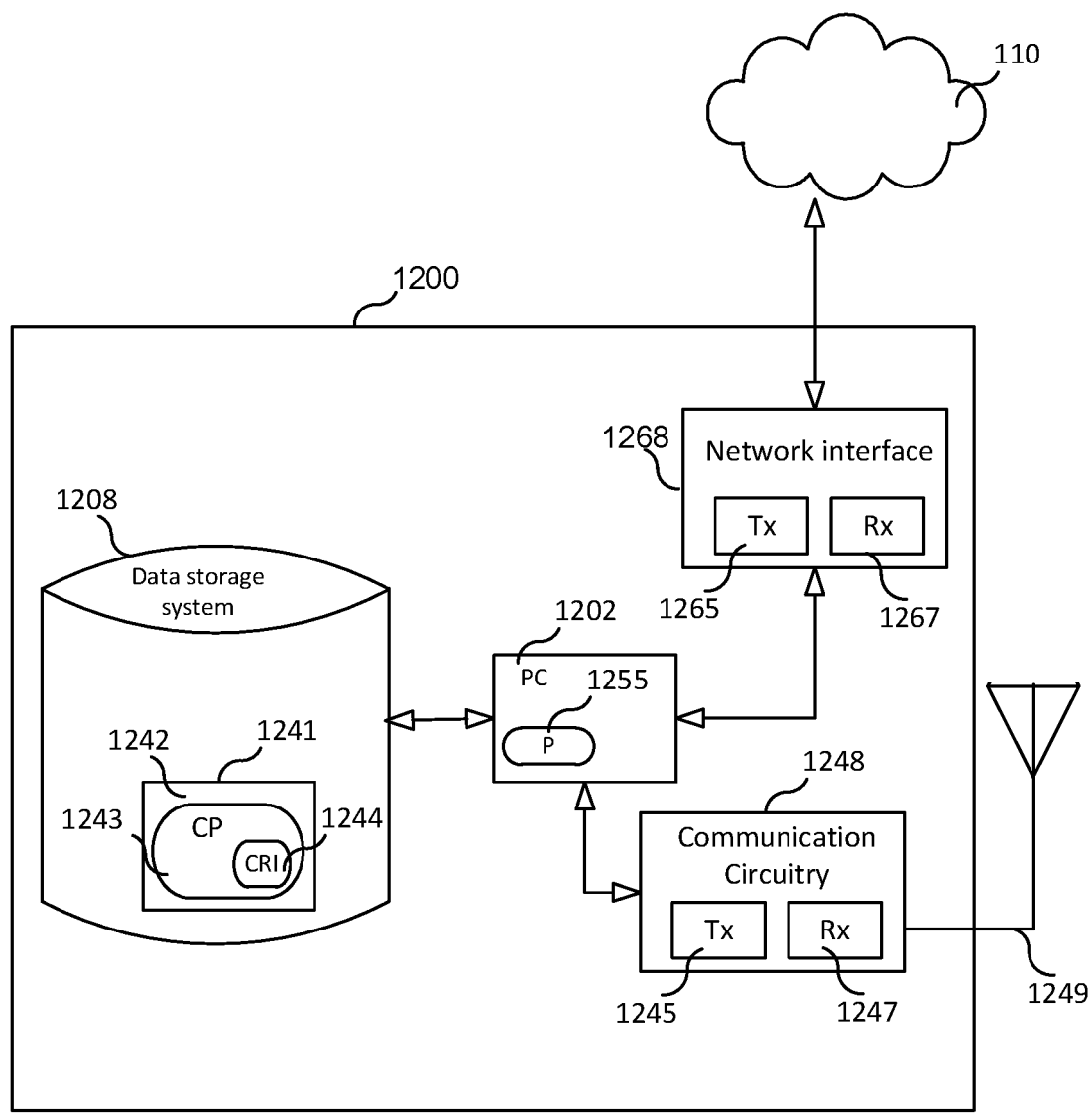
FIG. 12 is a block diagram illustrating an apparatus according to some embodiments.

FIG. 12 is a block diagram of an apparatus 1200, according to some embodiments. The apparatus 1200 may be used to implement the network node 104. As shown in FIG. 12, the network node may comprise: processing circuitry (PC) 1202, which may include one or more processors (P) 1255 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed (i.e., apparatus 1200 may be a distributed computing apparatus); a network interface 1268 comprising a transmitter (Tx) 1265 and a receiver (Rx) 1267 for enabling apparatus 1200 to transmit data to and receive data from other nodes connected to a network 110 (e.g., an Internet Protocol (IP) network) to which network interface 1248 is connected; communication circuitry 1348, which is coupled to an antenna arrangement 1249 comprising one or more antennas and which comprises a transmitter (Tx) 1245 and a receiver (Rx) 1247 for enabling the network node to transmit data and receive data (e.g., wirelessly transmit/receive data); and a local storage unit (a.k.a., "data storage system") 1208, which may include one or more non-volatile storage devices and/or one or more volatile storage devices. In embodiments where PC 1202 includes a programmable processor, a computer program product (CPP) 1241 may be provided. CPP 1241 includes a computer readable medium (CRM) 1242 storing a computer program (CP) 1243 comprising computer readable instructions (CRI) 1244. CRM 1242 may be a non-transitory computer readable medium, such as, magnetic media (e.g., a hard disk), optical media, memory devices (e.g., random access memory, flash memory), and the like. In some embodiments, the CRI 1244 of computer program 1243 is configured such that when executed by PC 1202, the CRI causes the network node to perform steps described herein (e.g., steps described herein with reference to the flow charts). In other embodiments, the network node may be configured to perform steps described herein without the need for code. That is, for example, PC 1202 may consist merely of one or more ASICs. Hence, the features of the embodiments described herein may be implemented in hardware and/or software.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for improving early data transmission, EDT, the method comprising:
   transmitting, during a first period, first transport block size, TBS, information indicating a first set of one or more EDT TBSs, the first set of EDT TBSs comprising a maximum EDT TBS;
   after transmitting the first TBS information, obtaining EDT usage information;
   based on the obtained EDT usage information, determining whether to transmit, during a second period, the first TBS information or second TBS information indicating a second set of one or more EDT TBSs, wherein the first set of EDT TBSs and the second set of EDT TBSs are different; and
   transmitting, during the second period, the first TBS information or the second TBS information based on the determination, wherein
   the EDT usage information comprises i) information indicating a number of EDTs performed during a time period and ii) for each EDT performed during the time period, information indicating the TBS used for the EDT.

2. The method of claim 1, wherein determining whether to transmit the first TBS information or the second TBS information comprises:
   calculating a resource efficiency based on the obtained EDT usage information;
   calculating an EDT usage ratio based on the obtained EDT usage information;
   comparing the resource efficiency to an efficiency threshold; and
   comparing the EDT usage ratio to a usage threshold.

3. The method of claim 2, wherein
   the resource efficiency is equal to RN/RA,
   RN corresponds to an amount of resource needed,
   RA corresponds to an amount of resource allocated,
   RA is equal to the maximum TBS, a probability value is assigned to each EDT TBS included in the first set of EDT TBSs, and RN is determined based on the assigned probability values.

4. The method of claim 3, wherein
$RN=\sum_{i=1}^{N} TBS(i)*pmf(i)$, where N is the number of EDT TBSs in the first set of one or more EDT TBSs, TBS (i) is the ith EDT TBS included in the first set of EDT TBSs, and pmf (i) is the probability value assigned to the ith EDT TBS.

5. The method of claim 2, wherein
determining whether to transmit the first TBS information or the second TBS information comprises comparing the resource efficiency to an efficiency threshold, and the method further comprises after determining that the resource efficiency is less than the efficiency threshold, selecting the second set of TBSs such that the second set of TBSs includes a maximum EDT TBS that is smaller than the maximum EDT TBS included in the first set of EDT TBSs.

6. The method of claim 2, wherein the EDT usage ratio is equal to $$\frac{nrof\_randomaccess\_edt}{nrof\_randomaccess\_edt + nrof\_randomaccess\_legacy},$$

where the nrof_randomaccess_edt corresponds to the number of EDT procedures performed during a period and the nrof_randomaccess_legacy corresponds to the number of a particular group of legacy procedures performed during the period.

7. The method of claim 2, wherein
determining whether to transmit the first TBS information or the second TBS information comprises comparing the EDT usage ratio to a usage threshold, and the method further comprises after determining that the EDT usage ratio is higher than the usage threshold, selecting the second set of TBSs such that the second set of TBSs includes a maximum EDT TBS that is smaller than the maximum EDT TBS included in the first set of EDT TBSs.

8. The method of claim 1, wherein determining whether to transmit the first TBS information or the second TBS information comprises calculating a resource efficiency based on the obtained EDT usage information.

9. The method of claim 1, wherein determining whether to transmit the first TBS information or the second TBS information includes calculating an EDT usage ratio based on a number of EDT procedures performed during a certain time period.

10. An apparatus for improving early data transmission, EDT, the apparatus comprising:
processing circuitry; and
a memory, said memory containing instructions executable by said processing circuitry, whereby said apparatus is operative to perform a method comprising:
transmitting, during a first period, first transport block size, TBS, information indicating a first set of one or more EDT TBSs, the first set of EDT TBSs comprising a maximum EDT TBS;
after transmitting the first TBS information, obtaining EDT usage information;
based on the obtained EDT usage information, determining whether to transmit, during a second period, the first TBS information or second TBS information indicating a second set of one or more EDT TBSs, wherein the first set of EDT TBSs and the second set of EDT TBSs are different; and transmitting, during the second period, the first TBS information or the second TBS information based on the determination, wherein
the EDT usage information comprises i) information indicating a number of EDTs performed during a time period and ii) for each EDT performed during the time period, information indicating the TBS used for the EDT.

11. The apparatus of claim 10, wherein determining whether to transmit the first TBS information or the second TBS information comprises:
calculating a resource efficiency based on the obtained EDT usage information;
calculating an EDT usage ratio based on the obtained EDT usage information;
comparing the resource efficiency to an efficiency threshold; and
comparing the EDT usage ratio to a usage threshold.

12. The apparatus of claim 11, wherein
the resource efficiency is equal to RN/RA,
RN corresponds to an amount of resource needed,
RA corresponds to an amount of resource allocated,
RA is equal to the maximum TBS,
a probability value is assigned to each EDT TBS included in the first set of EDT TBSs, and
RN is determined based on the assigned probability values.

13. The apparatus of claim 12, wherein
$RN=\sum_{i=1}^{N} TBS(i)*pmf(i)$, where N is the number of EDT TBSs in the first set of one or more EDT TBSs, TBS (i) is the ith EDT TBS included in the first set of EDT TBSs, and pmf (i) is the probability value assigned to the ith EDT TBS.

14. The apparatus of claim 11, wherein
determining whether to transmit the first TBS information or the second TBS information comprises comparing the resource efficiency to an efficiency threshold, and the method further comprises after determining that the resource efficiency is less than the efficiency threshold, selecting the second set of TBSs such that the second set of TBSs includes a maximum EDT TBS that is smaller than the maximum EDT TBS included in the first set of EDT TBSs.

15. The apparatus of claim 11, wherein the EDT usage ratio is equal to $$\frac{nrof\_randomaccess\_edt}{nrof\_randomaccess\_edt + nrof\_randomaccess\_legacy},$$

where the nrof_randomaccess_edt corresponds to the number of EDT procedures performed during a period and the nrof_randomaccess_legacy corresponds to the number of a particular group of legacy procedures performed during the period.

16. The apparatus of claim 11, wherein
determining whether to transmit the first TBS information or the second TBS information comprises comparing the EDT usage ratio to a usage threshold, and the method further comprises after determining that the EDT usage ratio is higher than the usage threshold, selecting the second set of TBSs such that the second set of TBSs includes a maximum EDT TBS that is smaller than the maximum EDT TBS included in the first set of EDT TBSs.

17. The apparatus of claim 10, wherein determining whether to transmit the first TBS information or the second TBS information comprises calculating a resource efficiency based on the obtained EDT usage information.

18. The apparatus of claim 10, wherein determining whether to transmit the first TBS information or the second TBS information includes calculating an EDT usage ratio based on a number of EDT procedures performed during a certain time period.

* * * * *